INVENTORS.
HOWARD BOLINGER
and RALPH W. BOLINGER

Aug. 8, 1967
H. BOLINGER ET AL
3,334,760
MATERIAL SPREADING VEHICLE
Filed July 16, 1965
2 Sheets-Sheet 2
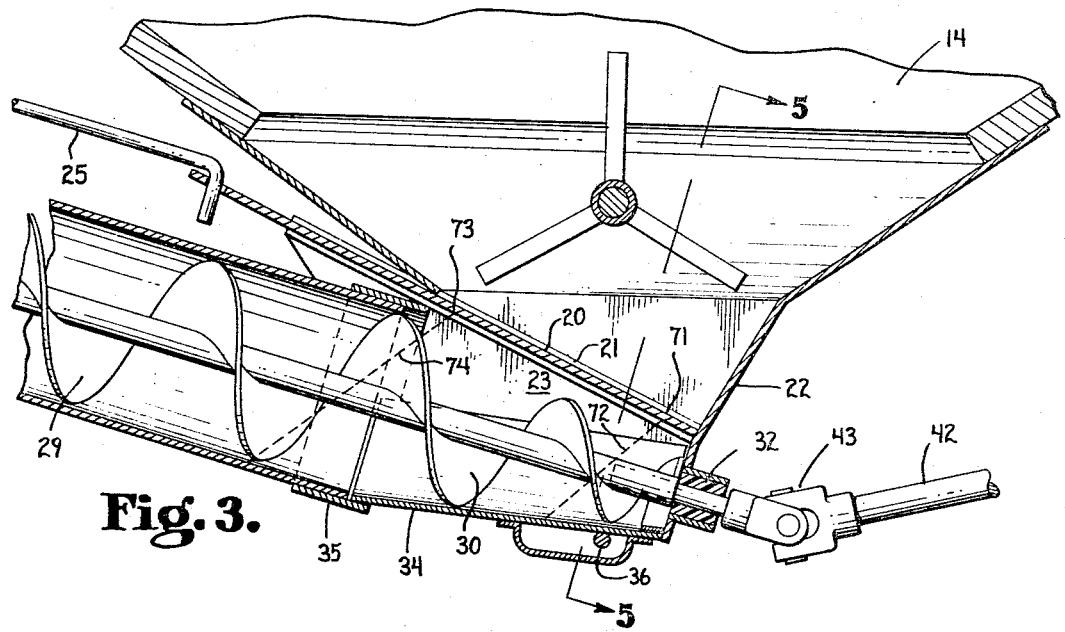
Fig. 3.
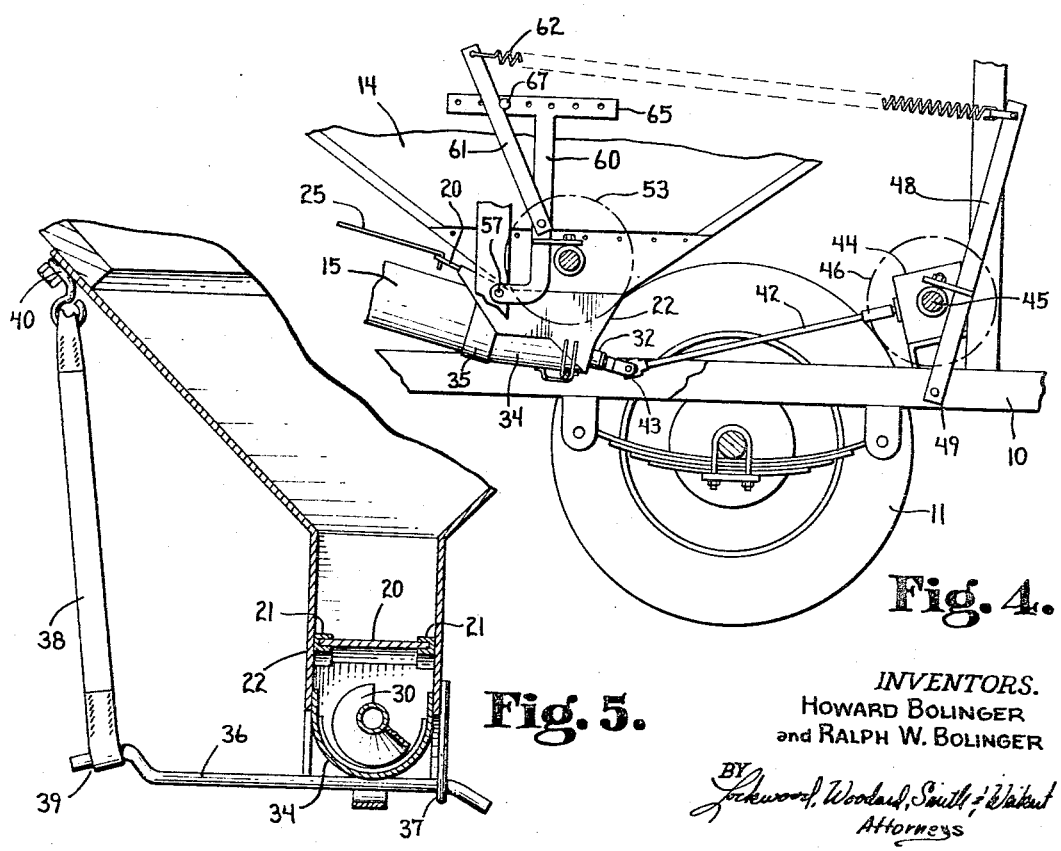
Fig. 4.
Fig. 5.
INVENTORS.
HOWARD BOLINGER
and RALPH W. BOLINGER
BY
Lockwood, Woodard, Smith & Wakut
Attorneys

United States Patent Office 3,334,760
Patented Aug. 8, 1967

3,334,760
MATERIAL SPREADING VEHICLE
Howard Bolinger and Ralph W. Bolinger,
Windfall, Ind. 46076
Filed July 16, 1965, Ser. No. 472,418
2 Claims. (Cl. 214—355)

ABSTRACT OF THE DISCLOSURE

A material spreading vehicle having a tapered feed screw, a slidable plate mounted thereover, a spout disposed to receive material from the discharge end of the feed screw, means within the spout for conveying material through the spout, and drive means coupled to the feed screw and a wheel for driving the screw at a rate no greater than a rate at which the constant and steady discharge of material per unit of area will be constant regardless of the speed of travel of the vehicle.

---

This invention relates generally to agricultural implements for spreading fertilizer, and the like, and more particularly to a material spreading vehicle having means for metering the flow of fertilizer or similar material out of a hopper and to a spreading apparatus in accordance with the speed of travel of the vehicle.

Conventional agricultural implements for spreading fertilizer, and the like, consist of a chassis which may be towed by a tractor, a hopper for carrying a quantity of material, and a discharge means adapted to spread the material. Such conventional apparatus usually does not have any satisfactory means of determining in advance, before entering the field, the amount of material which will be spread per acre. Thus, with conventional equipment it is difficult to spread a given desired amount of fertilizer, for example, per acre of ground to be covered. As a consequence, the ground may be under-fertilized or over-fertilized, thereby causing crop losses or excessive fertilizer expense.

Conventional fertilizer apparatus also lacks efficient means for conveying the fertilizer from the hopper to the spreading apparatus. For example, screw-type conveyors have been used, but the conveying capacity cannot be automatically adjusted to spread more or less fertilizer in accordance with variation of speed of the vehicle. Where the conveying apparatus runs at constant speed and the vehicle runs at different speeds, the amount of fertilizer applied to a given area of ground necessarily will vary, depending upon the speed at which the vehicle travels over the ground.

Accordingly, the principal object of this invention is to provide a material spreading vehicle having means for metering the quantity of fertilizer or other material in such a manner that the amount of fertilizer per unit of area will be constant regardless of the speed of travel of the vehicle.

Another object of this invention is to provide in a material spreading vehicle, a conveying means for discharging fertilizer or similar material from a hopper and having characteristics such that its capacity may automatically be increased or decreased depending upon the amount of material fed thereto and the speed of the vehicle.

In accordance with this invention there is provided a material spreading vehicle comprising a chassis having load supporting wheels, a hopper mounted on said chassis, conveying means disposed beneath said hopper, means for varying the amount of material flowing from said hopper, said conveying means including means effective to automatically adjust the capacity thereof in accordance with the amount of material discharged from said hopper, and drive means for said conveying means coupled to said wheels for driving the conveying means at a speed proportional to the speed of travel of said vehicle.

The full nature of the invention will be understood from the accompanying drawings and the following description and the claims:

FIG. 3 is a side elevation view, partially in cross section, illustrating the metering and conveying mechanism forming a part of the vehicle illustrated in FIGS. 1 and 2.

FIG. 4 is a side elevation view, with parts broken away, to illustrate the driving mechanism for the conveyor illustrated in FIGS. 2 and 3.

FIG. 5 is a cross section taken on line 5—5 of FIG. 3.

Figure 1:
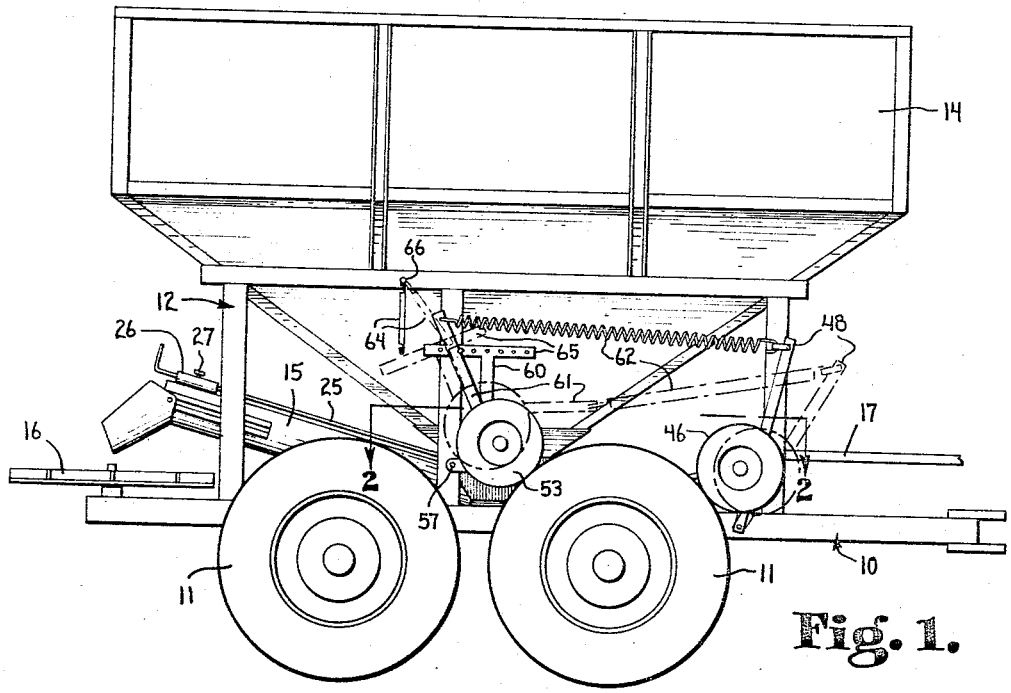
FIG. 1 is a side elevation view of the material spreading vehicle as provided in accordance with this invention.

The material spreading vehicle, as provided in accordance with this invention, comprises a chassis 10 having load supporting wheels 11 attached thereto in conventional manner, a frame structure 12 mounted on said chassis, and a hopper 14 mounted on the frame 12. The hopper 14 may be filled with fertilizer, or the like, and the chassis 10 may be towed by a conventional farm tractor. As will be subsequently explained, fertilizer will be discharged from the rear end of spout 15 as the vehicle moves over the ground. For spreading the fertilizer discharged from the spout there is provided a fan 16 which may be driven from the conventional power take-off mechanism of the tractor through the shaft assembly 17 which is connected to the power take-off of the tractor.

Figure 2:
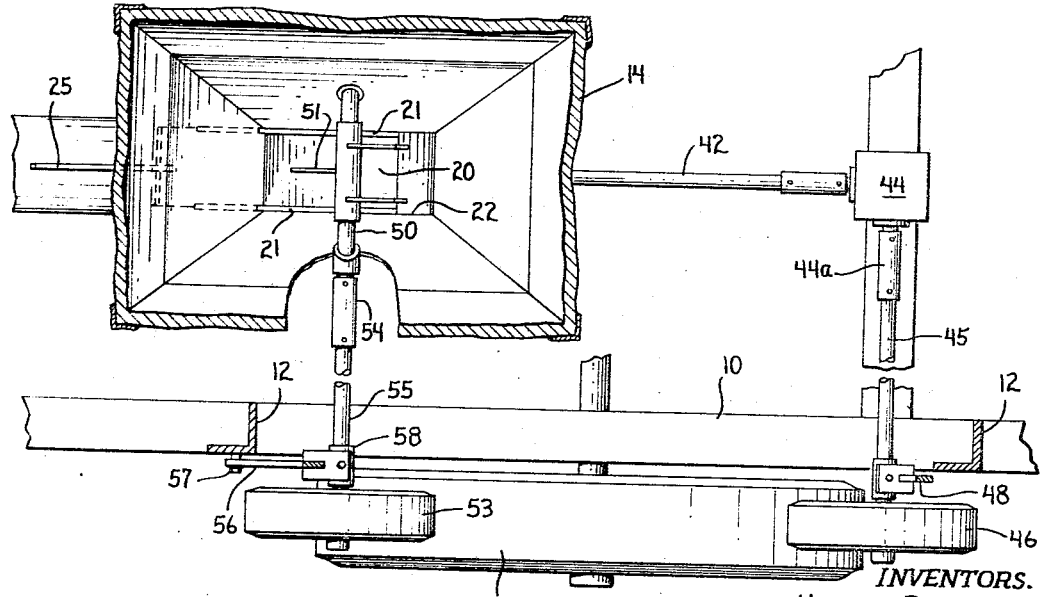
FIG. 2 is a horizontal cross section taken on line 2—2 of FIG. 1.

For controlling and metering the flow of material from the hopper to the spout there is provided an adjustable sliding plate 20 (FIGS. 2, 3) which may be mounted in a pair of parallel U-shaped slides 21 attached to and forming a part of a housing 22 which is an extension of the hopper 14. Although it will be apparent that the slide 20 may normally be positioned to close the opening 23 in the lower part of housing 22, it will be seen that it can be left open at any desired setting even when the hopper is filled with material, and the vehicle may be drawn by the tractor to the area on which the material is to be spread without losing material along the way. For the spreading operation, the sliding plate 20 may be adjusted to provide an opening in the bottom of the hopper of desired size by means of the adjusting rod 25. The rod extends along the top of the spout 15 and through a relatively short tubular member 26 fixed to the upper side of the spout. A setscrew 27 is provided for engaging the rod 25 to lock it in a given adjusted position.

For conveying the material through the spout 15 there is provided a screw-type conveyor which includes an elongated portion 29 disposed within the spout and having a thread of uniform pitch and diameter. The conveyor includes a second portion 30 disposed in the lower housing beneath the opening 23, and the thread on this portion of the conveyor has a minimum diameter at its outer end at the front of the lower housing and a maximum diameter at the end adjoining the portion 29 at the rear of the lower housing. Thus, the thread of portion 30 has, what may be termed, a frusto-conical configuration. The conveyor may be mounted in a suitable bearing 32 forming a part of the housing 22. For providing access to the tapered screw portion 30 of the conveyor there is provided a removable cover 34 supported at one end by a collar portion 35 of the housing 22 and at the other end by a bar 36 having one downturned end received and retained in the U-shaped support 37 fixed to the housing. The other downturned end of the bar is retained by a rubber strap 38 at 39, the upper end of the strap being connected to a hook 40 which may be fixed to the hopper, as illustrated, for normally holding the cover in closed position. Whenever it is desired to inspect or clean the conveyor portion 30, the strap 38 may be stretched to permit lowering the free end of the bar, whereupon the other end may be pulled out of the support 37 so that it can hang free and the cover can be removed to expose the conveyor.

For driving the conveyor there is provided a shaft 42, a universal joint 43 connecting the shaft to the conveyor, a gear box 44 of any conventional type adapted to provide a right angle drive, a flexible coupling 44a, a shaft 45, and a drive wheel 46 attached thereto and adapted to be engaged with one of the load supporting wheels 11. For supporting the wheel 46 and shaft 45 there is provided a lever 48 pivotally mounted to the chassis at 49. When the lever 48 is moved in a counterclockwise direction the wheel 46 will engage the load supporting wheel to drive the conveyor.

For agitating the material in the hopper adjacent to the sliding plate 20 there is provided a shaft 50 mounted in suitable bearings in the housing 22. Blades 51 are fixed to the shaft 50 to rotate therewith, and a drive wheel 53 is connected to shaft 50 through a flexible coupling 54 and a shaft 55. Wheel 53 and shaft 55 may be pivotally mounted to a portion of frame 12 by means of a bracket 56 pivoted to the frame at 57 and supporting a bearing 58 whereby wheel 53 may be pivoted into and out of engagement with the load supporting wheel 11.

For controlling engagement of wheels 46 and 53 with the load supporting wheel 11 there is provided a T-shaped extension 60 of the bracket 56. An arm member 61 is pivoted to member 60 and connected by a spring 62 to the upper end of the lever 48. For holding the wheel 53 out of contact with wheel 11 there is provided a strap 64 connected to the arm 65 of member 60 and also connected to the frame at 66. When the strap 64 is connected to the arm 65, wheel 53 is supported in the dotted line position out of engagement with wheel 11. Arm member 66 may hang free in the dotted line position and tension on spring 62 is relieved so that lever 48 will naturally fall and rotate in a clockwise direction and elevate wheel 46 out of contact with wheel 11. When the strap 64 is disconnected from the arm 65, wheel 53 may move downwardly about pivot 57 into contact with the wheel 11. Arm 61 may be pulled manually to the full line position (FIG. 4) and held there by a pin 67 mounted in arm 65 thereby to stretch the spring 62 enough to pull lever 48 in a counterclockwise direction to engage wheel 46 with the wheel 11. The spring tension also tends to pivot member 60 clockwise to engage wheel 53 with wheel 11. Thus, the agitator and the screw conveyor may be actuated or de-actuated by engaging or disengaging wheels 53 and 46 with wheel 11.

In operation, the amount of fertilizer or other dry type of flowable solid material to be spread per acre may be predetermined by setting the sliding plate 20 by means of the rod 25 to different positions, and in conjunction therewith, hand cranking the screw conveyor until a certain amount of material is discharged per revolution of the conveyor. Knowing the amount of material discharged per revolution of the conveyor, it is possible to calculate the amount of material which will be discharged per acre.

The size and shape of the frusto-conical portion 30 of the conveyor are such that, as the sliding plate 20 is opened to provide openings of greater and greater sizes, the increasing diameter of the conical screw portion 30 will have the capacity to carry an increasing amount of material discharged through the opening. However the shape is such that at any normal speed of operation in the field, between zero and ten miles per hour, for example, the space in the lower housing below the uncovered portion of the opening will always be full of material. In other words, the conveyor can never take material out faster than it can fall through the opening, regardless of the position of the plate 20. Therefore, if the plate 20 is opened to a slight extent so that the front edge is at a point 71 in FIG. 3, for example, the material from the hopper will fill the front of the lower housing below the uncovered portion of the opening back to the dotted line 72 which is, therefore, the location of the free surface of the material in the lower housing. If the plate is opened to the maximum, so that the front edge is at point 73, for example, the material from the hopper will fill the front of the lower housing below the uncovered portion of the opening, back to the dotted line 74, which is then the location of the free surface.

Therefore, by having a conical screw in the lower housing below the opening, and employing the plate 20 to determine where the free surface of material intercepts the conical portion of the screw, a steady discharge of material from the spout is assured regardless of the size of the uncovered portion of the opening, and yet it is the size of the uncovered portion which determines the rate of flow because it determines how much of the conical screw is working in the material being supplied by the hopper. Thus we have provided a means for metering the amount of material discharged by the positioning of a slidable plate and yet assuring that the discharge will be steady at whatever rate is desired. For example, we can adjust the plate to discharge anywhere from 75 pounds to 750 pounds of dry fertilizer per acre. To obtain a given volume of discharge per revolution of the screw, the plate location for one fertilizer may differ from that for another fertilizer if the flow characteristic from the hopper to the lower housing differ enough to significantly change the slope of the free surface in the lower housing. In any event, for a given setting with a given material, the amount of discharge per acre will be constant at the desired rate regardless of vehicle speed between zero and ten miles per hour, because the conveyor is rotated at a speed proportional to the vehicle speed.

Because of the fact that the spout is upwardly inclined to the rear, once a desired setting has been made for the plate 20, it need not be closed to avoid spreading of material where the spreading of material is not desired, such as on driveways or roads, for example. It is only necessary to disengage the drive wheel 46 from the load supporting wheel. So if the hopper becomes empty in the field, the vehicle can return to a supply location away from the field, the hopper can be refilled, and can return to the field where the spreading is to be accomplished. It is not necessary to touch the metering plate 20, because the material will flow from the hopper into the lower housing but will not flow up hill in the spout. Therefore none will be lost during travel over roads or elsewhere from the supply location to the field where the vehicle is to be used.

The invention claimed is:

1. A material spreading vehicle comprising a frame, axle and wheel structure supporting said frame, a hopper on said frame for carrying a quantity of flowable solid material and including a discharge opening at the bottom thereof, housing means at said opening, a plate member slidably mounted on said hopper for movement across said opening for varying the effective size of said opening between a closed position and a full open position and controlling the amount of material flowing through said opening and into said housing means; a material discharge spout mounted on said frame with one end adjacent said opening and the other end adjacent and below one end of said hopper, a feed screw of uniform diameter within said spout and having an end portion beneath said opening the thread structure of which is of progressively larger diameter from the end adjacent the closed position of said plate member to the end adjacent the full open position of said plate member, and means connected to a wheel of said vehicle for driving said feed screw at a rate corresponding to the speed of said vehicle, the size of said opening, the progression in diameter of the said end portion of the feed screw beneath said opening, and the feed screw driving means being selected to maintain a rate of discharge from said hopper through said opening which is constantly equal to the rate of discharge of material from the spout by said feed screw and which is determined by the degree of closure of said opening by said plate member.

2. A material spreading vehicle as set forth in claim 1 wherein said discharge spout is upwardly inclined from the end adjacent said opening to the said other end, whereby material in said spout will remain therein unless discharged therefrom by driving said feed screw.

References Cited
UNITED STATES PATENTS

| | | |
|---|---|---|
| 2,127,018 | 8/1938 | Young. |
| 2,281,212 | 4/1942 | Stoltzfus _____ 275—8 |
| 2,311,726 | 2/1943 | Blue _____ 275—2 X |
| 2,490,971 | 12/1949 | Lawson et al. _____ 275—8 |
| 3,019,025 | 1/1962 | Young _____ 275—15 X |

ABRAHAM G. STONE, *Primary Examiner.*

J. R. OAKS, *Assistant Examiner.*